US009262572B2

(12) United States Patent
Ganesan et al.

(10) Patent No.: US 9,262,572 B2
(45) Date of Patent: Feb. 16, 2016

(54) FAST AND ACCURATE CAPACITANCE CHECKER

(71) Applicant: Apple Inc., Cupertino, CA (US)

(72) Inventors: Raghuraman Ganesan, San Ramon, CA (US); Am M. Yusuf, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/317,681

(22) Filed: Jun. 27, 2014

(65) Prior Publication Data
US 2015/0379179 A1 Dec. 31, 2015

(51) Int. Cl.
*G06F 17/50* (2006.01)
(52) U.S. Cl.
CPC ........ *G06F 17/5072* (2013.01); *G06F 17/5081* (2013.01); *G06F 17/5022* (2013.01)
(58) Field of Classification Search
CPC ............ G06F 17/5081; G06F 17/5022; G06F 17/5072
USPC ...................... 716/106, 111, 115, 105; 703/15
See application file for complete search history.

(56) References Cited

U.S. PATENT DOCUMENTS

| 7,302,664 | B2 | 11/2007 | Haridass et al. |
| 7,600,208 | B1 | 10/2009 | Sharma et al. |
| 8,479,136 | B2 | 7/2013 | Hopkins et al. |
| 8,739,097 | B2 | 5/2014 | Hu et al. |
| 2004/0030511 | A1* | 2/2004 | Tien et al. ...................... 702/60 |
| 2008/0052657 | A1* | 2/2008 | Tsujimoto ....................... 716/10 |
| 2010/0254163 | A1* | 10/2010 | Martini et al. .................. 363/17 |
| 2013/0054202 | A1* | 2/2013 | Carlsen et al. ..................... 703/2 |
| 2014/0038529 | A1* | 2/2014 | Adlerstein ....................... 455/73 |

* cited by examiner

*Primary Examiner* — Phallaka Kik
(74) *Attorney, Agent, or Firm* — Meyertons, Hood, Kivlin, Kowert & Goetzel, P.C.; Gareth M. Sampson; Lawrence J. Merkel

(57) ABSTRACT

Switching cells and decoupling capacitors in an integrated circuit design may be assessed to ensure voltage stability during high-speed switching events. Assessment of the switching cells and decoupling capacitors may include identifying the locations of the switching cells and the decoupling capacitors and dividing the integrated circuit design into a number of equally sized bins. Selected bins for each switching cell may be identified. The selected bin for each switching cell may be assessed, along with one or more bins neighboring the selected bin, to determine if a sufficient number of decoupling capacitors are available in these bins to provide voltage stability for each switching cell in the integrated circuit design.

20 Claims, 4 Drawing Sheets

FAST AND ACCURATE CAPACITANCE CHECKER

BACKGROUND

1. Technical Field

Embodiments described herein relate to integrated circuit layouts and designs. More particularly, the embodiments described herein relate to analyzing integrated circuit designs and modifying the integrated circuit design based on the design analysis.

2. Description of Related Art

For deep sub-micron technologies, IR drop (voltage drop across the device) in the power grid of an integrated circuit due to switching activity (e.g., high-speed switching activity) may have performance implications, especially for high-speed integrated circuits. Typically, in order to ensure voltage stability (and minimize IR drop) during high-speed switching events, an integrated circuit design may be analyzed to make sure there is a sufficient number of decoupling capacitors (dcaps) placed locally around each high-speed switching cell (e.g., clock buffers) in the design so that there is enough charge available for each high-speed switching cell. The design may also be analyzed to make sure that the dcaps associated with a high-speed switching cell are located within a certain distance from the cell. Having the dcaps closer to the high-speed switching cell increases effectiveness of the dcaps.

For a typical integrated circuit design, the number of high-speed switching cells (e.g., clock buffers) may be in the thousands while the number of dcaps, or dcap cells, may be in the millions. A conventional approach to analyzing the integrated circuit design is to check the location of each high-speed switching cell against the location of all the dcaps in the design using a computer processor. Such an approach may, however, be time consuming and cumbersome as it would require on the order of 1 billion checks between switching cells and dcaps in a typical integrated circuit design. For example, an integrated circuit design with 15,000 high-speed switching cells (clock buffers) and 5 million dcaps may take around 11 hours to check using the computer processor. Additionally, it may be difficult using this approach to ensure accuracy in associating dcaps with individual switching cells if neighboring switching cells are relatively close together (e.g., the neighboring switching cells are a distance apart that is less than the allowable distance between a switching cell and a dcap).

SUMMARY

In certain embodiments, a process is used to assess switching cells and decoupling capacitors in an integrated circuit design. The switching cells and decoupling capacitors may be assessed to determine if each switching cell in the design has a sufficient number of decoupling capacitors available to it in order to provide voltage stability in the switching cell. Assessment of the switching cells and decoupling capacitors may include identifying x- and y-coordinates of each switching cell and each decoupling capacitor in the design. The design may be divided into a grid having a desired number of equally sized bins. In certain embodiments, the bins are square bins of equal size and the design is divided into a grid with an equal number of columns and rows.

Each decoupling capacitor may be associated with a bin in the grid that contains the x- and y-coordinates of the decoupling capacitor. A selected bin may be identified for each switching cell in the grid (e.g., the design). For each selected bin, bins that neighbor the selected bin are identified. The neighboring bins may be adjacent a side or a corner of the selected bin.

In certain embodiments, each selected bin and one or more of its neighboring bins are assessed to determine if there is a sufficient number of decoupling capacitors in these bins that are available to each switching cell in the selected bin. The sufficient number of available decoupling capacitors may be a number of decoupling capacitors needed to provide voltage stability in each switching cell. In some embodiments, each decoupling capacitor in the grid is associated with, or assigned to, only one switching cell to avoid overlapping usage of decoupling capacitors. In certain embodiments, the decoupling capacitors available to a switching cell are within a selected distance form the switching cell.

BRIEF DESCRIPTION OF THE DRAWINGS

Features and advantages of the methods and apparatus of the embodiments described in this disclosure will be more fully appreciated by reference to the following detailed description of presently preferred but nonetheless illustrative embodiments in accordance with the embodiments described in this disclosure when taken in conjunction with the accompanying drawings in which.

Figure 1:
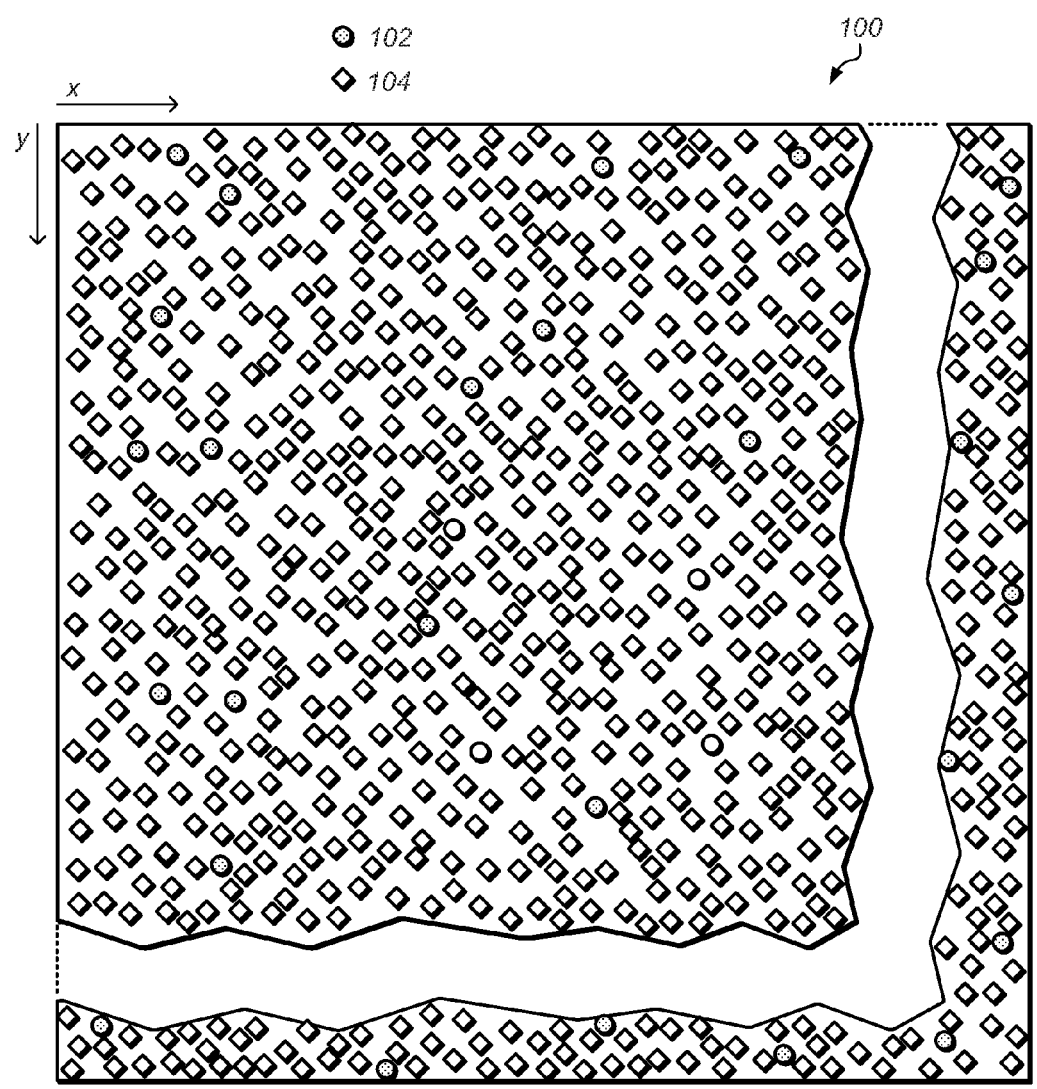
FIG. 1 depicts a plan view of an embodiment of a portion of an integrated circuit design.

While the embodiments described in this disclosure may be susceptible to various modifications and alternative forms, specific embodiments thereof are shown by way of example in the drawings and will herein be described in detail. The drawings may not be to scale. It should be understood that the drawings and detailed description thereto are not intended to limit the embodiments to the particular form disclosed, but to the contrary, the intention is to cover all modifications, equivalents and alternatives falling within the spirit and scope of the appended claims.

DETAILED DESCRIPTION OF EMBODIMENTS

FIG. 1 depicts a plan view of an embodiment of a portion of an integrated circuit design. Integrated circuit design 100 may include switching cells 102 (circles) and decoupling capacitors 104 (diamonds) at various locations in the design. In certain embodiments, switching cells 102 are high-speed switching cells such as clock buffers. For simplicity in the drawings, FIG. 1 depicts only a portion of a complete integrated circuit design. Thus, FIG. 1 shows only a limited number of switching cells 102 and decoupling capacitors 104 in design 100. It is to be understood that design 100 may include a significant number of switching cells 102 and decoupling capacitors 104. For example, a typical integrated circuit design may include between about 3,000 and about 15,000 switching cells and between about 1 million to about 5 million decoupling capacitors while FIG. 1 shows smaller amounts of switching cells 102 and decoupling capacitors 104.

Figure 2:
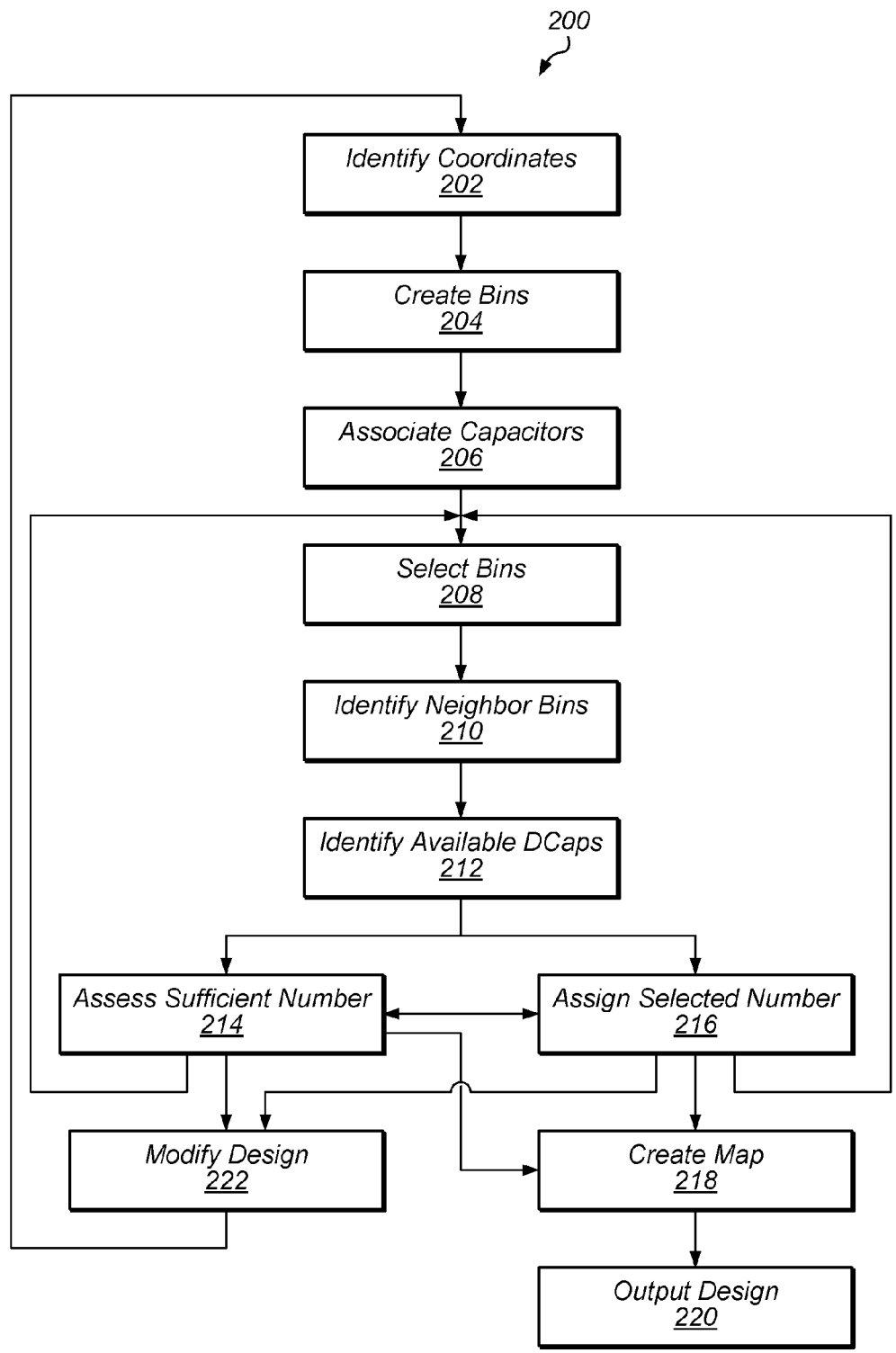
FIG. 2 depicts a flowchart of an embodiment of a process for assessing switching cells and decoupling capacitors in an integrated circuit design.

FIG. 2 depicts a flowchart of an embodiment of a process for assessing switching cells 102 and decoupling capacitors 104 in design 100. Process 200 may begin with "Identify coordinates 202". In 202, the x- and y-coordinates of switching cells 102 and decoupling capacitors 104 are identified in design 100. It is to be understood that the x- and y-coordinates, as used in embodiments herein, describe the orthogonal coordinates of a component in a plane (e.g., the x- and y-coordinates are orthogonal coordinates along the x-axis and y-axis shown in FIG. 1). Identifying the x- and y-coordinates for switching cells 102 and decoupling capacitors 104 provides an (x,y) location for each switching cell and each decoupling capacitor).

Figure 3:
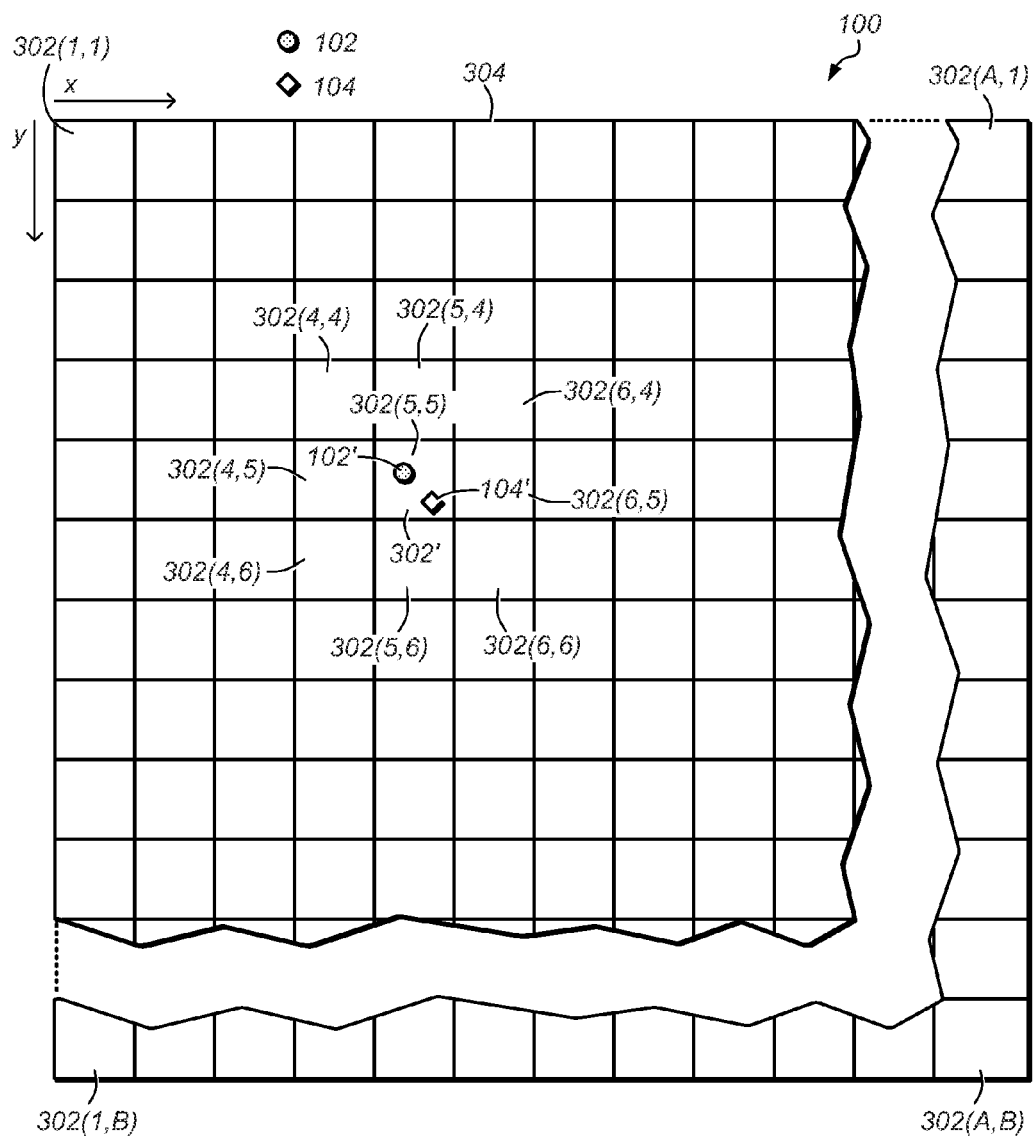
FIG. 3 depicts a plan view of an embodiment of a portion of an integrated circuit design divided into bins.

In certain embodiments, process 200 continues with "Create bins 204". In 204, design 100 may be divided into a selected number of bins of selected x- and y-dimensions. FIG. 3 depicts a plan view of an embodiment of a portion of design 100 divided into bins 302. It is to be understood that the switching cells 102 and decoupling capacitors 104 in design 100 shown in FIG. 3 would be in similar locations and in similar numbers to the switching cells and decoupling capacitors in FIG. 1. For simplicity in the drawing, however, a majority of switching cells 102 and decoupling capacitors 104 are not shown in FIG. 3.

As shown in FIG. 3, design 100 may be divided into the selected number of bins by dividing the design into grid 304. Grid 304 may include a matrix of bins with a selected number of bin columns (e.g., columns 1 through A for a total number of A columns, as shown in FIG. 3) and a selected number of bin rows (e.g., rows 1 through B for a total number of B rows, as shown in FIG. 3). Thus, design 100 may have A×B number of bins 302. The total number of bins 302 in grid 304 may be selected based on factors such as, but not limited to, size or area of design 100, number of switching cells 102 and/or decoupling capacitors 104, and properties (e.g., size and/or speed) of the switching cells and/or the decoupling capacitors.

In certain embodiments, bins 302 are substantially equally sized (e.g., each bin is the same size as every other bin). In certain embodiments, bins 302 are square bins (e.g., the bins have the same x- and y-dimensions). Thus, grid 304 may be a square grid including an equal number of bin columns (A) and bin rows (B), and the total number of bins may be $A^2$ or $B^2$ (given A=B and the total number of bins is A×B).

In certain embodiments, the dimensions of bins 302 (e.g., the x- and y-dimensions of the bins) are related to a maximum desired distance (e.g., a selected distance) between each switching cell 102 and the decoupling capacitors 104 that are available for assignment with each switching cell. For example, the dimensions of bins 302 may be on the order of the maximum desired distance (e.g., the selected distance) between each switching cell 102 and its available decoupling capacitors 104. In certain embodiments, the dimensions of bins 302 are substantially the same as the maximum desired distance (e.g., the selected distance) between each switching cell 102 and its available decoupling capacitors 104. The maximum desired distance may be, for example, a distance selected based on factors such as, but not limited to, the number of switching cells 102 and/or decoupling capacitors 104 and the properties (e.g., size and/or speed) of the switching cells and/or decoupling capacitors. In certain embodiments, the maximum desired distance is selected to allow decoupling capacitors 104 to affectively operate in conjunction with their associate (assigned) switching cell 102.

While process 200, shown in FIG. 2, shows "Create bins 204" following "Identify coordinates 202", it is to be understood that the order of these 2 steps may be exchanged. Thus, bins 302 may be created in grid 304 in 204 before the coordinates of switching cells 102 and decoupling capacitors 104 are identified in 202.

After 202 and 204, process 200 continues with "Associate capacitors 206", as shown in FIG. 2. In 206, each decoupling capacitor 104, shown in FIG. 3, is associated with its respective bin 302 (e.g., the bin containing the decoupling capacitor). Association of each decoupling capacitor 104 with its respective bin 302 may be achieved by assigning each decoupling capacitor to the bin that includes (contains) the x- and y-coordinates of the decoupling capacitor. For example, decoupling capacitor 104', shown in FIG. 3, has x- and y-coordinates that put the decoupling capacitor in bin 302(5,5) and thus, decoupling capacitor 104' may be associated with (assigned to) bin 302(5,5).

Following 206, process 200 may continue with "Select bins 208", as shown in FIG. 2. In 208, a bin (e.g., bin 302 shown in FIG. 3) may be selected for each switching cell 102 in design 100 (e.g., grid 304). Thus, each switching cell 102 in design 100 is now associated with a selected bin for that switching cell. In some embodiments, more than one switching cell 102 may be in the same selected bin. Association of switching cells 102 and bins 302 may be achieved by assigning each switching cell to the bin that includes (contains) the x- and y-coordinates of the switching cell. For example, switching cell 102', shown in FIG. 3, has x- and y-coordinates that put the switching cell in bin 302(5,5) and thus, bin 302 (5,5) may be selected bin 302' for switching cell 102'.

After selecting the bin for each switching cell, process 200 may include "Identify neighbor bins 210", as shown in FIG. 2. In 210, bins 302 that neighbor each selected bin are identified. Neighboring bins may include bins that are adjacent the selected bin. In certain embodiments, the neighboring bins include bins that share a side and/or bins that share a corner with the selected bin. Thus, each selected bin may have 8 neighboring bins for a square grid pattern of bins. For example, if bin 302(5,5), shown in FIG. 3, is the selected bin, then the 8 neighboring bins may include bins 302(4,5), 302 (6,5), 302(5,4), 302(5,6) that share a side with the selected bin and bins 302(4,4), 302(4,6), 302(6,4), 302(6,6) that share a corner with the selected bin.

After the neighboring bins have been identifed, process 200 may proceed with "Identify available dcaps 212". In 212, decoupling capacitors 104 that are available for each switching cell (e.g., switching cell 102') in a selected bin (e.g., selected bin 302') are identified in the selected bin and its neighboring bins. In 212, the search and identification of available decoupling capacitors is limited to the selected bin and its neighboring bins. Searching only in the selected bin and the neighboring bins significantly reduces the search area for identifying available decoupling capacitors. For example, if n is the total number of switching cells and decoupling capacitors, a typical search (checking each switching cell against every decoupling capacitor in the design) would involve $n^2$ searches. In 212, however, only 9 bins (e.g., the selected bin and its 8 neighboring bins) may be searched. Thus, in a design divided into 10000 bins (e.g., A×B=100× 100), the search space is reduced by a factor of 9/10000 (e.g., there may now be only $n^2 \times 9/10000$ searches). Reducing the number of bins for identification in 212 may reduce the computational capacity needed to perform the search and significantly increase the speed for the process of ensuring there is a sufficient number of decoupling capacitors placed locally around each switching cell in the design.

In certain embodiments, available decoupling capacitors include decoupling capacitors 104 that are in either selected bin 302' or its neighboring bins and that are within a selected distance from switching cell 102' in the selected bin. The selected distance, as described above, may be the maximum desired distance between each switching cell 102 and its available decoupling capacitors 104. The selected distance may be selected based on factors such as, but not limited to, the number of switching cells 102 and/or decoupling capacitors 104 and the properties (e.g., size and/or speed) of the switching cells and/or decoupling capacitors.

In certain embodiments, the selected distance is less than the distance from the switching cell (e.g., switching cell 102') to a furthest point in the bins neighboring the selected bin (e.g., selected bin 302'). Having distance from the switching cell to a furthest point in the neighboring bins be greater than the selected distance may ensure that any available decoupling capacitors for the switching cell are not located beyond the neighboring bins.

In some embodiments, a distance of a decoupling capacitor to a switching cell is calculated by a Pythagorean Theorem calculation using each component's x- and y-coordinates found in 202. The calculated distance may then be compared to the selected distance to see if the decoupling capacitor is within the selected distance and thus, "available" to the switching cell.

In certain embodiments, available decoupling capacitors include decoupling capacitors that are not used for another switching cell (e.g., decoupling capacitors that have not been assigned to or associated with another switching cell as described herein). For example, once decoupling capacitors are assigned to or associated with a switching cell, as described in step 216 below, these decoupling capacitors are removed from being available for association with any other switching cell in the design (e.g., the coordinates of these decoupling capacitors may be removed from any further searches for decoupling capacitors). Marking decoupling capacitors as "assigned" and removing them from availability for another switching cell may inhibit overlapping usage of decoupling capacitors between relatively close switching cells (e.g., switching cells that are within the selected distance from each other). Additionally, not allowing decoupling capacitors to be available to more than one switching cell may provide more accurate assignment and mapping of switching cells and their associated decoupling capacitors.

In some embodiments, in 212, the process of identifying decoupling capacitors 104 that are available for each switching cell begins with identifying decoupling capacitors that are available in the selected bin and its neighboring bins that share a wall in one direction (e.g., the x-direction) before looking at decoupling capacitors in other neighboring bins. For example, for switching cell 102' in bin 302' (e.g., bin 302(5,5), available decoupling capacitors may be identified in the selected in (bin 302(5,5)), bin 302(4,5), and bin 302(6,5) before decoupling capacitors in any other neighboring bins are assessed. Thus, if the sufficient number of available decoupling capacitors (as described in step 214 below) is found in only the selected bin and its neighboring bins that share the wall in one direction, no further assessment of available decoupling capacitors is needed in the other neighboring bins. Checking only these bins may save time, increase the speed of process 200, and reduce the computational capacity needed for the process. If the sufficient number of available decoupling capacitors is not found in only the selected bin and its neighboring bins that share the wall in one direction, the other neighboring bins may be assessed for available decoupling capacitors.

After available decoupling capacitors are identified in 212, process 200 may proceed, in some embodiments, with "Assess sufficient number 214" or, in some embodiments, with "Assign selected number 216". In some embodiments, steps 214 and 216 are performed in combination in process 200 with one step following the other step. Steps 214 and 216 may be performed in combination with either step being the first step.

In 214, the available decoupling capacitors identified in 212 are assessed to determine if there are a sufficient number of the available decoupling capacitors in the selected bin and its neighboring bins for each switching cell in the selected bin. The sufficient number of the available decoupling capacitors may be a number of decoupling capacitors needed to provide voltage stability in each switching cell during, for example, switching events (such as high-speed switching events). The sufficient number of available decoupling capacitors 104 needed for each switching cell 102 in design 100, shown in FIG. 3, may depend on a number of factors including, but not limited to, the properties (e.g., size and/or speed) of each switching cell and/or the distance between each switching cell and each of the available decoupling capacitors. Thus, the sufficient number of available decoupling capacitors 104 needed for each switching cell 102 in design 100 may vary between switching cells. In some embodiments, if one or more switching cells in design 100 do not have the sufficient number of available decoupling capacitors, the design is modified in 222, which is described below.

In 216, shown in FIG. 2, a selected number of the available decoupling capacitors identified in 212 are assigned to each switching cell in the selected bin (e.g., switching cell 102' in selected bin 302' shown in FIG. 3). In certain embodiments, the selected number of the available decoupling capacitors assigned to each switching cell is the number of decoupling capacitors needed to provide voltage stability in the switching cell during, for example, switching events (e.g., the selected number is the sufficient number of available capacitors needed as described above). In some embodiments, the selected number of the available decoupling capacitors assigned to each switching cell is provided to 214 to assess if the selected number of assigned decoupling capacitors is a sufficient number to provide voltage stability in the switching cell.

In some embodiments, the selected number of the available decoupling capacitors assigned to each switching cell includes the available decoupling capacitors identified in 212 that are closest to the switching cell. For example, if 20 decoupling capacitors are identified in 212 as being available to a switching cell but only 15 decoupling capacitors are needed for the switching cell (e.g., to provide voltage stability in the switching cell), then the 15 decoupling capacitors assigned to the switching cell may be the 15 decoupling capacitors of the 20 identified decoupling capacitors that closest to the switching cell.

In certain embodiments, after 214 and/or 216, a map of each of the switching cells and their assigned decoupling capacitors is created in "Create map 218". The created map may be, for example, a plan view or layout view of design 100 (e.g., a plan view similar to FIG. 3) showing all the switching cells and decoupling capacitors in the design with indicators or other markings differentially identifying the decoupling capacitors assigned to each switching cell.

In certain embodiments, after the map is created in 218, the integrated circuit design (e.g., design 100) is output (e.g., provided as a final design) in "Output design 220". In some embodiments, the integrated circuit design is output without creating the map of switching cells and decoupling capacitors (e.g., step 218 is skipped after either 214 or 216).

In certain embodiments, if one or more switching cells in design 100 do not have the sufficient number of available decoupling capacitors after either 214, 216, and/or 218, the design is modified in "Modify design 222". Modifying design 100 may include adding additional decoupling capacitors to the design in selected locations. The locations may be selected to provide the one or more switching cells that do not have the sufficient number of available decoupling capacitors with the sufficient number of available decoupling capacitors. Thus, design 100 may be modified by adding decoupling capacitors where needed until each switching cell in the design has its sufficient number of decoupling capacitors. In some embodiments, the locations are identified using the map created in 218. In certain embodiments, after design 100 is modified in 222, process 200 may be repeated starting in 202, as shown in FIG. 2, to ensure that the additional decoupling capacitors added to the design provide the sufficient number for each switching cell in the design.

In certain embodiments, one or more process steps described herein are operated using software executable by a processor (e.g., a computer processor). For example, process 200, shown in FIG. 2 may have one or more steps controlled or operated using software executable by the processor. In some embodiments, the process steps are stored as program instructions in a computer readable storage medium (e.g., a non-transitory computer readable storage medium) and the program instructions are executable by the processor.

Figure 4:
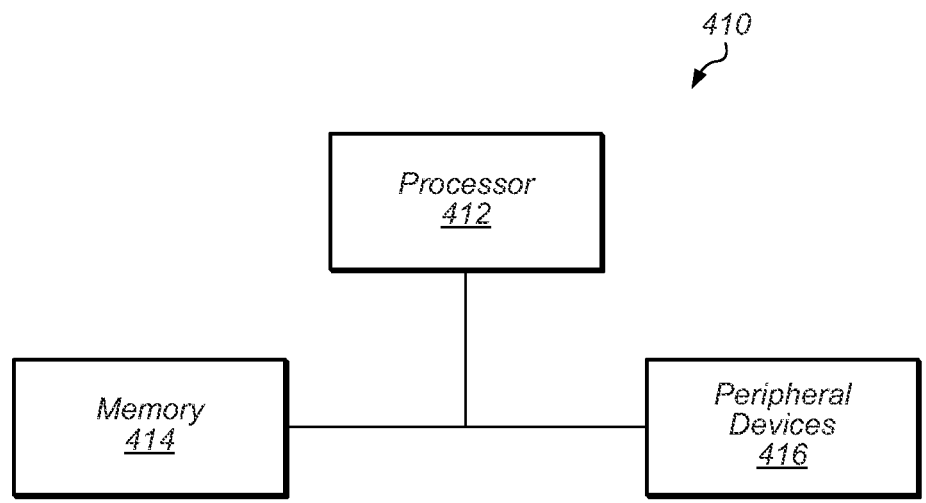
FIG. 4 depicts a block diagram of one embodiment of an exemplary computer system.

FIG. 4 depicts a block diagram of one embodiment of exemplary computer system 410. Exemplary computer system 410 may be used to implement one or more embodiments described herein. In some embodiments, computer system 410 is operable by a user to implement one or more embodiments described herein such as process 200, shown in FIG. 2. In the embodiment of FIG. 4, computer system 410 includes processor 412, memory 414, and various peripheral devices 416. Processor 412 is coupled to memory 414 and peripheral devices 416. Processor 412 is configured to execute instructions, including the instructions for process 200, which may be in software. In various embodiments, processor 412 may implement any desired instruction set (e.g. Intel Architecture-32 (IA-32, also known as x86), IA-32 with 64 bit extensions, x86-64, PowerPC, Sparc, MIPS, ARM, IA-64, etc.). In some embodiments, computer system 410 may include more than one processor.

Processor 412 may be coupled to memory 414 and peripheral devices 416 in any desired fashion. For example, in some embodiments, processor 412 may be coupled to memory 414 and/or peripheral devices 416 via various interconnect. Alternatively or in addition, one or more bridge chips may be used to coupled processor 412, memory 414, and peripheral devices 416.

Memory 414 may comprise any type of memory system. For example, memory 414 may comprise DRAM, and more particularly double data rate (DDR) SDRAM, RDRAM, etc. A memory controller may be included to interface to memory 414, and/or processor 412 may include a memory controller. Memory 414 may store the instructions to be executed by processor 412 during use, data to be operated upon by the processor during use, etc.

Figure 5:
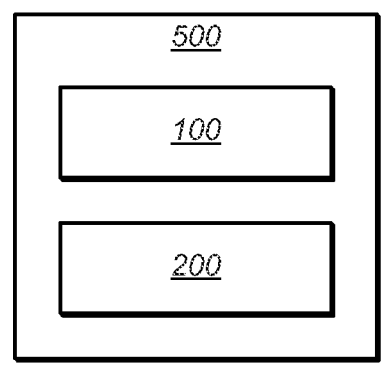
FIG. 5 depicts a block diagram of one embodiment of a computer accessible storage medium.

Peripheral devices 416 may represent any sort of hardware devices that may be included in computer system 410 or coupled thereto (e.g. storage devices, optionally including computer accessible storage medium 500, shown in FIG. 5, other input/output (I/O) devices such as video hardware, audio hardware, user interface devices, networking hardware, etc.).

Turning now to FIG. 5, a block diagram of one embodiment of computer accessible storage medium 500 including one or more data structures representative of switching cells and decoupling capacitors included in design 100 (depicted in FIGS. 1 and 3) and one or more code sequences representative of process 200 (depicted in FIG. 2) is shown. Each code sequence may include one or more instructions, which when executed by a processor in a computer, implement the operations described for the corresponding code sequence. Generally speaking, a computer accessible storage medium may include any storage media accessible by a computer during use to provide instructions and/or data to the computer. For example, a computer accessible storage medium may include non-transitory storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, computer accessible storage medium 500 may store data in a non-transitory manner, where non-transitory in this context may refer to not transmitting the instructions/data on a signal. For example, non-transitory storage may be volatile (and may lose the stored instructions/data in response to a power down) or non-volatile.

Further modifications and alternative embodiments of various aspects of the embodiments described in this disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described herein are to be taken as the presently preferred embodiments. Elements and materials may be substituted for those illustrated and described herein, parts and processes may be reversed, and certain features of the embodiments may be utilized independently, all as would be apparent to one skilled in the art after having the benefit of this description. Changes may be made in the elements described herein without departing from the spirit and scope of the following claims.

What is claimed is:

1. A method, comprising:
   identifying, using a computer processor, x- and y-coordinates of switching cells and decoupling capacitors in a design for an integrated circuit;
   dividing, using the computer processor, the design into a selected number of equally sized bins of selected x- and y-dimensions;
   associating each decoupling capacitor of the decoupling capacitors with one of the bins that includes the x- and y-coordinates of that decoupling capacitor;
   identifying for each switching cell in the design, using the computer processor, a selected bin containing the switching cell;
   identifying, using the computer processor, the bins neighboring the selected bin in the design;
   identifying, using the computer processor, available decoupling capacitors in both the selected bin and the neighboring bins, wherein the available decoupling capacitors are within a selected distance from the switching cell in the selected bin, and wherein the available decoupling capacitors comprise decoupling capacitors that are not used for another switching cell in the design; and assessing, using the computer processor, if there are a sufficient number of the available decoupling capacitors in both the selected bin and the neighboring bins to provide voltage stability for the switching cell in the selected bin.

2. The method of claim 1, further comprising assigning, using the computer processor, a selected number of the available decoupling capacitors in both the selected bin and the neighboring bins to the switching cell in the selected bin.

3. The method of claim 1, wherein the x- and y-dimensions of each bin are substantially identical such that each bin has square dimensions.

4. The method of claim 1, wherein the neighboring bins comprise bins sharing a side or a corner with the selected bin.

5. The method of claim 1, further comprising, if one or more of the switching cells does not have the sufficient number of available decoupling capacitors, modifying the design using a computer processor until each switching cell has the sufficient number of available decoupling capacitors.

6. The method of claim 1, wherein the bins have x- and y-dimensions that are on the order of the selected distance.

7. The method of claim 1, wherein identifying the available decoupling capacitors in both the selected bin and the neighboring bins comprises identifying available decoupling capacitors in the selected bin and the two neighboring bins that are adjacent walls of the selected bin in the x-direction and then, if the sufficient number of the available decoupling capacitors is not found in such bins, identifying available decoupling capacitors in the remaining neighboring bins.

8. A method, comprising:
identifying, using a computer processor, x- and y-coordinates of switching cells and decoupling capacitors in a design for integrated circuit;
dividing, using the computer processor, the design into a selected number of equally sized bins of selected x- and y-dimensions;
associating each decoupling capacitor of the decoupling capacitors with one of the bins that includes the x- and y-coordinates of that decoupling capacitor;
identifying for each switching cell in the design, using the computer processor, a selected bin containing the switching cell;
identifying, using the computer processor, the bins neighboring the selected bin in the design;
identifying, using the computer processor, available decoupling capacitors in both the selected bin and the neighboring bins, wherein the available decoupling capacitors are within a selected distance from the switching cell in the selected bin, and wherein the available decoupling capacitors comprise decoupling capacitors that are not used for another switching cell in the design; and
assigning, using the computer processor, a selected number of the available decoupling capacitors in both the selected bin and the neighboring bins to the switching cell in the selected bin.

9. The method of claim 8, wherein the assigned available decoupling capacitors are identified as being the selected number of the available decoupling capacitors that are closest to the switching cell in the selected bin.

10. The method of claim 8, further comprising assessing, using the computer processor, if the selected number of the available decoupling capacitors comprises a number of decoupling capacitors sufficient to provide voltage stability in the switching cell in the selected bin during switching events.

11. The method of claim 8, wherein the selected number of the available decoupling capacitors comprises a number of decoupling capacitors selected to provide voltage stability in the switching cell in the selected bin during switching events.

12. The method of claim 8, wherein the neighboring bins are adjacent the selected bin in the design.

13. The method of claim 8, wherein the bins have x- and y-dimensions that are substantially equal to the selected distance.

14. The method of claim 8, further comprising creating, using the computer processor, a map of each of the switching cells and its assigned available decoupling capacitors.

15. The method of claim 14, further comprising, if one or more of the switching cells does not have a sufficient number of available decoupling capacitors to provide voltage stability in the switching cell in the selected bin during switching events:
identifying, using a computer processor and the created map, locations for additional decoupling capacitors needed to provide each switching cell with the sufficient number of available decoupling capacitors in the design; and
modifying the design by placing, using the computer processor, the additional decoupling capacitors at the identified locations in the design.

16. A non-transitory computer readable storage medium including program instructions executable by a processor to:
identify x- and y-coordinates of switching cells and decoupling capacitors in a design for integrated circuit;
divide the design into a selected number of equally sized bins of selected x- and y-dimensions;
associate each decoupling capacitor of the decoupling capacitors with one of the bins that includes the x- and y-coordinates of that decoupling capacitor;
identify for a first switching cell in the design a first selected bin containing the first switching cell;
identify the bins neighboring the first selected bin in the design;
identify decoupling capacitors in both the first selected bin and its neighboring bins, wherein the decoupling capacitors are within a selected distance from the first switching cell;
assess if there are a sufficient number of the decoupling capacitors in both the first selected bin and its neighboring bins to provide voltage stability for the first switching cell;
assign a first selected number of the decoupling capacitors in both the first selected bin and its neighboring bins to the first switching cell;
identify for a second switching cell in the design a second selected bin containing the second switching cell;
identify the bins neighboring the second selected bin in the design;
identify available decoupling capacitors in both the second selected bin and its neighboring bins, wherein the available decoupling capacitors are within the selected distance from the second switching cell, and wherein the available decoupling capacitors comprise decoupling capacitors that have not been assigned to the first switching cell;
assess if there are a sufficient number of the available decoupling capacitors in both the second selected bin and its neighboring bins to provide voltage stability for the second switching cell; and assign a second selected number of the decoupling capacitors in both the second selected bin and its neighboring bins to the second switching cell.

17. The non-transitory computer readable storage medium of claim 16, wherein, for each additional switching cell in the design, the program instructions are further executable by the processor to:

identify for each additional switching cell in the design an additional selected bin containing the additional switching cell;

identify the bins neighboring the additional selected bin in the design;

identify available decoupling capacitors in both the additional selected bin and its neighboring bins, wherein the available decoupling capacitors are within the selected distance from the additional switching cell, and wherein the available decoupling capacitors comprise decoupling capacitors that have not been assigned to the first switching cell or the second switching cell and decoupling capacitors that have not been assigned to another additional switching cell;

assess if there are a sufficient number of the available decoupling capacitors in both the additional selected bin and its neighboring bins to provide voltage stability for the additional switching cell; and assign an additional selected number of the decoupling capacitors in both the additional selected bin and its neighboring bins to the additional switching cell.

18. The non-transitory computer readable storage medium of claim 16, wherein a furthest point in the neighboring bins of each selected bin is greater than the selected distance.

19. The non-transitory computer readable storage medium of claim 16, wherein, if one or more of the switching cells does not have the sufficient number of available decoupling capacitors, the program instructions are further executable by the processor to modify the design by adding additional decoupling capacitors to the design until such switching cells have the sufficient number of available decoupling capacitors.

20. The non-transitory computer readable storage medium of claim 16, wherein the sufficient number of decoupling capacitors to provide voltage stability for each switching cell is dependent on a size and/or speed of each switching cell.

* * * * *